(12) United States Patent
Lyons, Jr. et al.

(10) Patent No.: US 7,512,966 B2
(45) Date of Patent: Mar. 31, 2009

(54) SYSTEM AND METHOD FOR VISUALLY RENDERING RESOURCE POLICY USAGE INFORMATION

(75) Inventors: Theodore Patrick Lyons, Jr., Apex, NC (US); Christopher Johan Schaubach, Cary, NC (US); Carrie Weaver Searcey, Cary, NC (US); Hong S. Zhang, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 910 days.

(21) Appl. No.: 10/965,658

(22) Filed: Oct. 14, 2004

(65) Prior Publication Data

US 2006/0085836 A1    Apr. 20, 2006

(51) Int. Cl.
*H04L 9/00* (2006.01)

(52) U.S. Cl. .......................... 726/1; 709/223; 709/226; 718/100; 718/102; 718/104

(58) Field of Classification Search ..................... 726/1; 718/100, 102, 104; 709/223, 226
See application file for complete search history.

(56) References Cited

U.S. PATENT DOCUMENTS

| | | | | |
|---|---|---|---|---|
| 4,890,227 | A | * | 12/1989 | Watanabe et al. ............. 706/14 |
| 5,826,260 | A | | 10/1998 | Byrd, Jr. et al. ................ 707/5 |
| 6,693,651 | B2 | | 2/2004 | Biebesheimer et al. ...... 345/837 |
| 6,718,535 | B1 | | 4/2004 | Underwood ................ 717/101 |
| 6,983,317 | B1 | * | 1/2006 | Bishop et al. ............... 709/223 |
| 7,246,105 | B2 | * | 7/2007 | Numanoi et al. ............... 707/1 |
| 7,272,646 | B2 | * | 9/2007 | Cooper et al. .............. 709/223 |
| 2002/0152305 | A1 | * | 10/2002 | Jackson et al. .............. 709/224 |
| 2003/0046396 | A1 | * | 3/2003 | Richter et al. .............. 709/226 |
| 2004/0046789 | A1 | | 3/2004 | Inanoria ..................... 345/748 |
| 2005/0010819 | A1 | * | 1/2005 | Williams et al. ............ 713/201 |

FOREIGN PATENT DOCUMENTS

WO    WO 01/39029    5/2001

OTHER PUBLICATIONS

CiscoWorks, "User Guide for QoS Policy Manager 3.1", http://www.cisco.com, 2003.*

* cited by examiner

*Primary Examiner*—Kambiz Zand
*Assistant Examiner*—Tongoc Tran
(74) *Attorney, Agent, or Firm*—Yee & Associates, P.C.; Robert Straight

(57) ABSTRACT

A system and method for visually rendering resource policy usage information are provided. The system and method make use of policy performance data and relative weighting values of policies to generate, for each system resource, a graphical representation of the system resource with regard to the affect of policies on their behavior within the IT infrastructure. The resulting visual depiction of the IT infrastructure provides a visual representation that quickly communicates to the user which resources have the most/least policies guiding their behavior and the frequency of evaluation of these policies. For example, a large graphical element with a negative color may alert the user that the system resource is heavily affected by policies but that the policies are not being evaluated frequently enough.

3 Claims, 5 Drawing Sheets

SYSTEM AND METHOD FOR VISUALLY RENDERING RESOURCE POLICY USAGE INFORMATION

BACKGROUND OF THE INVENTION

1. Technical Field

The present invention is generally directed to an improved data processing system. More specifically, the present invention is directed to a system and method for visually rendering resource policy usage information for information technology infrastructures.

2. Description of Related Art

Many tools exist for monitoring the performance of information technology infrastructures, such as electronic business systems or the like. For example, International Business Machines, Inc. (IBM) provides a number of various systems for monitoring and managing information technology infrastructures including IBM Tivoli Business Systems Manager, IBM Tivoli Enterprise Console, IBM Tivoli Monitoring, and the like.

While these performance monitoring and management systems provide important information for managing information technology (IT) infrastructures, sometimes it may be difficult for a system administrator to determine the affect of the performance of one information technology infrastructure resource relative to other information technology infrastructure resources. This is because the output from current IT infrastructure management and performance monitoring systems is not provided in as intuitive and easily understandable a manner as is necessary for the average person. In addition, while the output from these systems may be used to understand the operation and usage of a particular system resource, the output does not provide a completely clear and intuitive representation of the operation and usage of that particular system resource relative to other system resources and the system as a whole.

Moreover, the performance monitoring and management systems focus on obtaining information about the operation of a system resource and do not focus on the affect of and implementation of business policies by these system resources. Thus, while it is possible to determine the number of processor cycles a system resource uses, an amount of usage of a bandwidth of a communication connection, which system resources are on-line and which are off-line, etc., the current performance monitoring and management systems do not provide a graphical representation of the affect of business policies on the operation of the system resources.

Therefore, it would be beneficial to have a system and method that provides an easily discernable visual representation of the relative importance of an affect of policies of resources on the behavior of the resources and the infrastructure as a whole.

BRIEF SUMMARY OF THE INVENTION

The present invention provides a system and method for visually rendering resource policy usage information. More specifically, the present invention provides a system and method for visually rendering the affect of policies on the behavior of information technology (IT) infrastructure resources taking into account the relative importance of the policies in the policy-based IT infrastructure.

In one exemplary embodiment, performance data for policies associated with system resources is obtained using a policy evaluation engine associated with the IT infrastructure. Weighting value information for each policy is then obtained from a policy database. Then, for each system resource that is to be represented in a visual representation of the IT infrastructure, a first characteristic of the graphical element for representing resource policy utilization is then determined based on the weighting value information. For example, this first characteristic may be a size of the graphical element. A second characteristic, such as an emphasis characteristic, is then determined based on policy performance data associated with the system resource. Thereafter, the graphical element for representing the system resource is generated. Once each graphical element for each system resource that is to be represented in the visual representation is generated, the visual representation of the IT infrastructure is generated.

Various mechanisms for determining the first and second characteristics of the graphical element are described in the following description. Each mechanism provides a slightly different indication of the importance of the affect of policies on the behavior of a system resource. The resulting IT infrastructure visual representation provides an indicator of the relative importance of system resources with regard to the affects of policies on their behavior.

These and other features and advantages of the present invention will be described in, or will become apparent to those of ordinary skill in the art in view of, the following detailed description of the preferred embodiments.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE INVENTION

Figure 1:
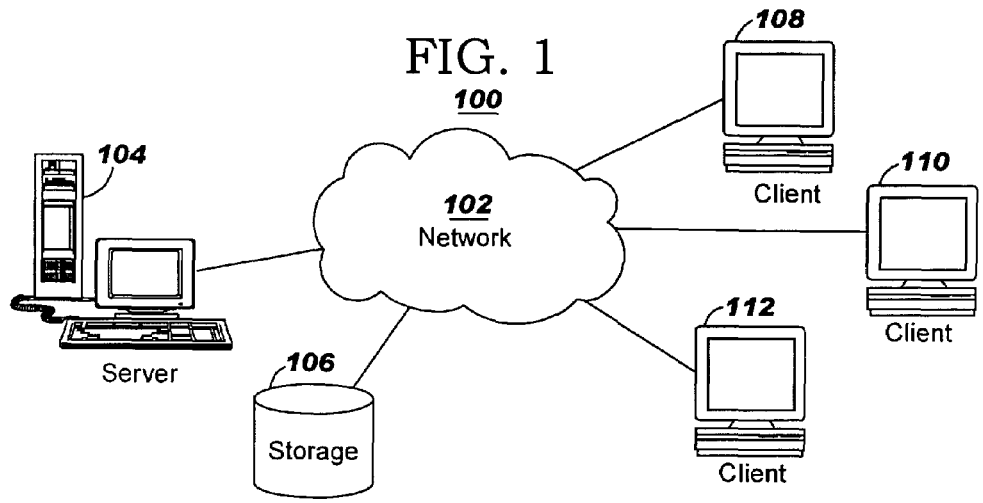
FIG. 1 is an exemplary diagram of a distributed data processing system in which aspects of the present invention may be implemented.
Figure 2:
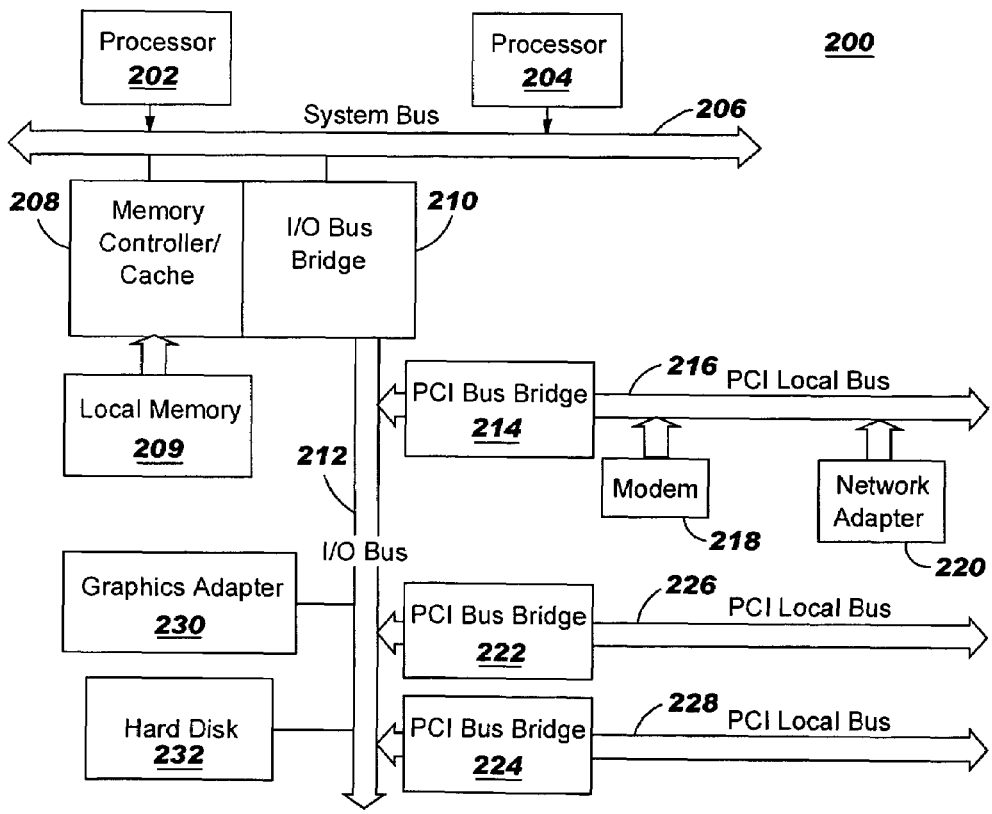
FIG. 2 is an exemplary diagram of a server computing device in which aspects of the present invention may be implemented.
Figure 3:
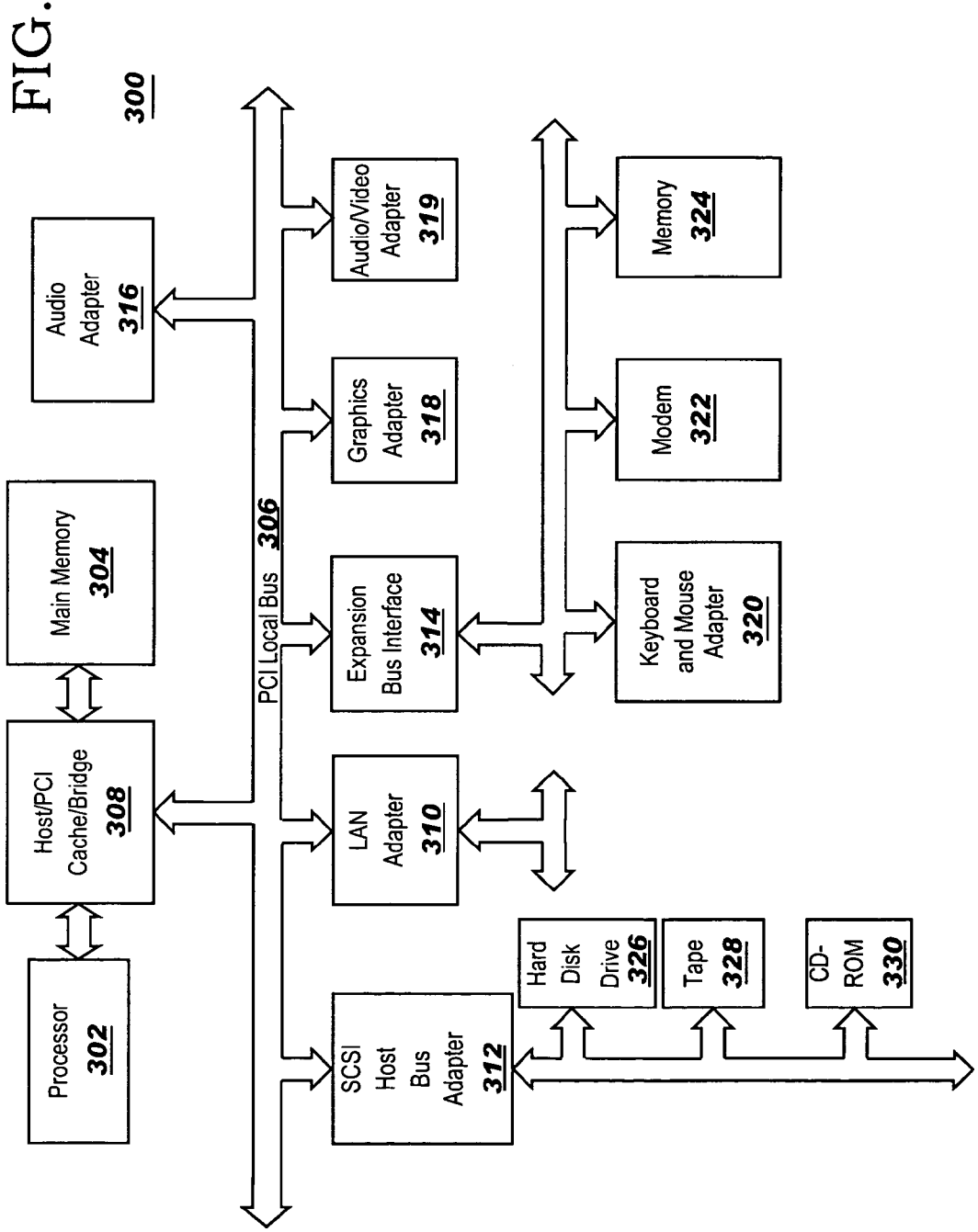
FIG. 3 is an exemplary diagram of a client computing device in which aspects of the present invention may be implemented.

The present invention provides a system and method for visually rendering the affect of policies on the behavior of information technology (IT) infrastructure resources taking into account the relative importance of the policies in the policy-based IT infrastructure. The present invention is especially well suited for implementation in a distributed data processing system such as a local area network (LAN), wide area network (WAN), the Internet, or the like. As such, FIGS. 1-3 are provided as exemplary computing environments and computing devices in which aspects of the present invention may be implemented. It should be appreciated that FIGS. 1-3 are only exemplary and no limitation on the particular environments or computing devices that may be used to implement the present invention is intended to be stated or implied by the depictions in these figures.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O Bus Bridge 210 is connected to system bus 206 and provides an interface to I/O bus 212. Memory controller/cache 208 and I/O Bus Bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI Bridge 308. PCI Bridge 308 also may include an integrated memory controller and cache memory for processor 302. Additional connections to PCI local bus 306 may be made through direct component interconnection or through add-in boards. In the depicted example, local area network (LAN) adapter 310, small computer system interface (SCSI) host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented programming system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interfaces As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

As discussed above, the present invention provides system and method for visually rendering the affect of policies on the behavior of information technology (IT) infrastructure resources taking into account the relative importance of the policies in the policy-based IT infrastructure. For example, the operations of the present invention may be implemented using a server, such as server 200, which may be associated with an information technology (IT) infrastructure, such as an organization's local area network, an organization's virtual private network which may be widely distributed, an electronic business system, or the like.

As is well known to those of ordinary skill in the art, an IT infrastructure is one or more systems of computing devices and computing resources that are organized together for the purpose of providing computing capability for a particular business organization, governmental organization, or other type of organization. An IT infrastructure may be comprised of a number of different system resources including application servers, proxy servers, databases, various software applications, communication connections, storage devices, network routers, and the like. For purposes of the present description, the term "system resource" is intended to include any hardware or software resource of an IT infrastructure.

Many mechanisms have been devised for monitoring and managing these system resources. For example, International Business Machines, Inc. (IBM) provides a number of various systems for monitoring and managing information technology infrastructures including IBM Tivoli Business Systems Manager, IBM Tivoli Enterprise Console, IBM Tivoli Monitoring, and the like. From these performance monitoring and management systems, information regarding the implementation of policies by the various resources of an IT infrastructure may be obtained. This information may be maintained as part of performance data compiled by a policy evaluation engine for later use by a system administrator when determining whether reconfiguration of the IT infrastructure is necessary to achieve a desired performance.

The present invention makes use of such compiled information regarding the implementation of policies by IT infrastructure system resources, along with other information about the policies and the IT infrastructure, to generate a graphical representation of the affect of these policies, e.g., business policies, on the operation of the IT infrastructure system resources as well as the system as a whole. The graphical representation of the present invention provides a visual display of how policies are affecting the behavior of the IT infrastructure system resources in the context of the policies' relative importance in the policy-based IT infrastructure.

With the present invention, each IT infrastructure system resource is represented in a graphical representation of the IT infrastructure as a particular graphical element, e.g., a geometric shape, a bar in a bar-chart, a line in a line-graph, a portion of a pie-chart, an element in a block diagram, etc. The graphical element has both a size characteristic and an emphasis characteristic. The emphasis characteristic may take on many different forms including various colors for the graphical element, various patterns, various effects, such as flashing, blinking, pulsing and the like, or other visual cues that emphasize one graphical element in relation to other graphical elements when perceived by a human user.

In a preferred embodiment, a value of the size characteristic is determined based on a function of a weight value, e.g., a business value, associated with the policies affecting that IT infrastructure system resource. The value of the size characteristic is used to graphical draw the graphical element on a display of a user's computer representing that particular system resource. Furthermore, in such a preferred embodiment, a value of the emphasis characteristic is determined based on a function of a number of times policies affecting the IT infrastructure system resource are evaluated during operation of the system resource. The value of the emphasis characteristic is used to select an emphasis to be applied to the graphical element having the size identified by the size characteristic. In a preferred embodiment, various colors may be selected based on the value of the emphasis characteristic with the resulting graphical element having a size determined according to the value of the size characteristic and a color corresponding to the value of the emphasis characteristic.

In operation, the policy evaluation engine associated with the IT infrastructure gathers performance data for each of the system resources in the IT infrastructure for a specified period of time. This period of time may be set as a predetermined amount of elapsed time, a specific time or range of times of day, week, month, year, or the like. Any amount of time may be used without departing from the spirit and scope of the present invention.

The performance data that is gathered may include, for example, the policies that were evaluated by a system resource or whose results affected operation of the system resource, the number of times each policy, that was evaluated by or affected the operation of a system resource, was evaluated, and the like. Other performance information may also be collected, such as CPU utilization, bandwidth utilization, memory utilization, and the like, as is generally known in the art.

The policy usage information visual rendering system of the present invention obtains this performance data from a performance data storage and uses it along with weight value information for each of the policies of the IT infrastructure to generate the graphical representation of the IT infrastructure system resources. The graphical representation provides a visual representation of the IT infrastructure in such a way that those system resources that are relatively more important are more prominently depicted in the graphical representation.

For example, those system resources that either evaluated, or were otherwise affected by, policies having higher weight values associated with them will have a graphical element that is larger in size than other system resources associated with policies that have lower weight values. Moreover, those system resources that have evaluated policies, or been affected by the results of evaluated policies, more often than other system resources are depicted with a graphical element having an emphasis characteristic that is more prominent than other system resources that are associated with policies that have been evaluated less frequently. In this way, those system resources that are most active and relatively more important are given greater emphasis in the display of the system resources of the IT infrastructure. As a result, a system administrator's attention is brought to these system resources more effectively.

Figure 4:
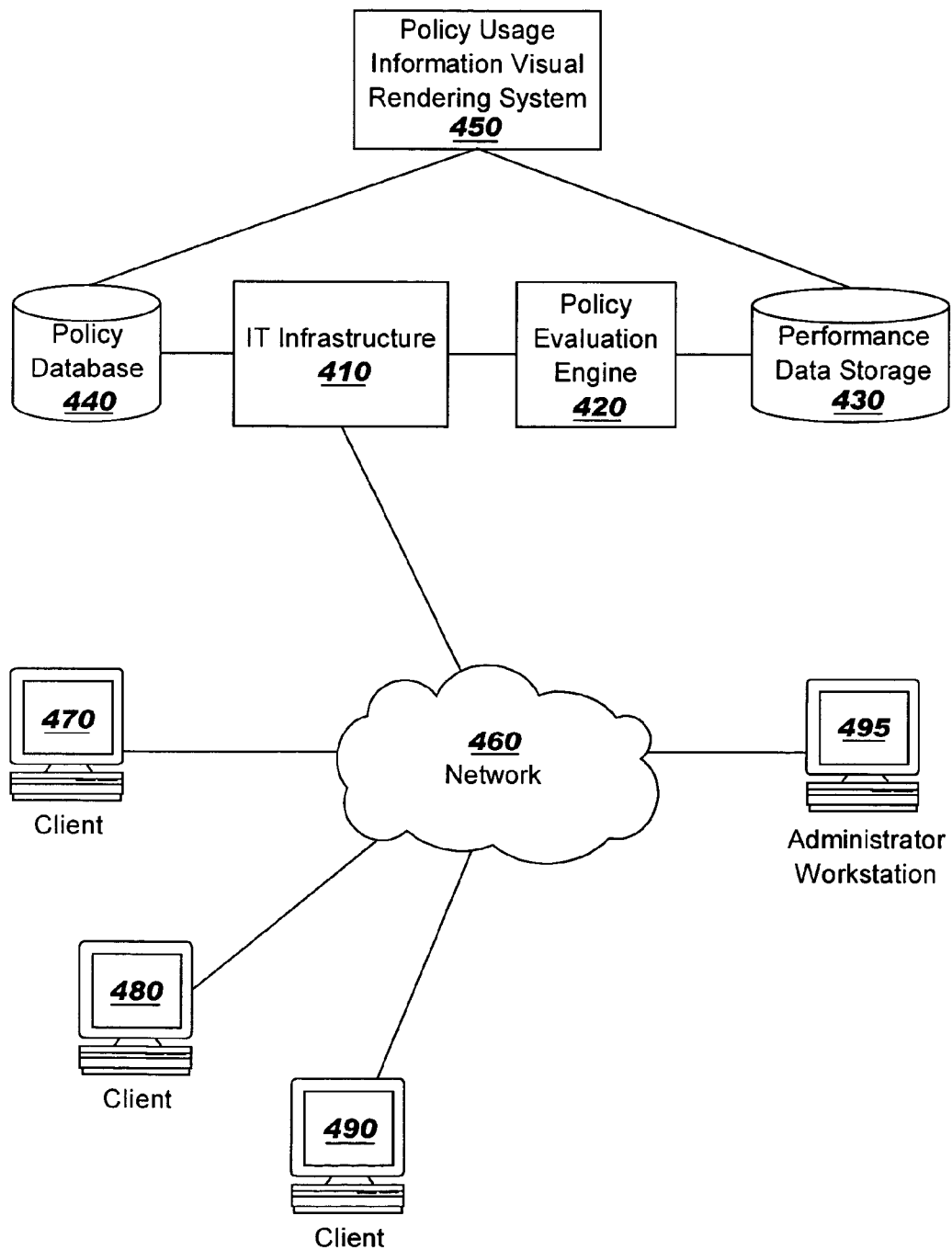
FIG. 4 is an exemplary diagram illustrating the primary operational components of one exemplary embodiment of the present invention.

FIG. 4 is an exemplary diagram illustrating the primary operational components of one exemplary embodiment of the present invention. As shown in FIG. 4, a system according to one exemplary embodiment of the present invention includes an IT infrastructure 410, which may include a plurality of different computing devices and computer related system resources, a policy evaluation engine 420, a performance data storage 430, a policy database 440, and a policy usage information visual rendering system 450. The IT infrastructure 410, policy evaluation engine 420, and performance data storage 430 are similar to known systems and thus, a detailed explanation is not provided herein.

It should be noted that the IT infrastructure 410 responds to requests from client computing devices 470-490 in order to provide services and content to the client computing devices 470-490. The IT infrastructure 410 operates under the control of established policies stored in the policy database 440. These policies provide the guidance as to how the IT infrastructure makes decisions when processing requests from the client computing devices 470-490 and decisions on how to manage the computing systems and computer related system resources in the IT infrastructure 410 in order to achieve established operational goals.

During operation of the IT infrastructure 410, the policy evaluation engine 420 monitors the operation of the various computing devices and computer related system resources of the IT infrastructure 410 and collects performance data which is stored in the performance data storage 430. The policy evaluation engine 420 may be a stand-alone machine in the IT Infrastructure 410, an embedded engine within other software within the IT Infrastructure 410, or the like. The performance data 430 may include identifiers of which policies from the policy database 440 were evaluated by each computing device and/or computer related system resource, identifiers of policies whose results affected each computing device and/or computer related system resource, and the like.

The policy database 440 is similar to known policy databases with the addition of a weighting value be associated with each policy stored in the policy database 440. This weighting value, or business value, identifies the relative importance of that policy when compared to other policies in the policy database 440. The weighting value may be assigned by a system administrator when establishing the policies or updating the policies in the policy database 440. Alternatively, the weighting value may be determined dynamically based on a frequency-with which a policy is evaluated within the IT infrastructure. For example, an initial weighting value may be assigned to a policy, however, when the policy evaluation engine 420 determines that the policy is evaluated by system resources in the IT infrastructure 410 more than a predetermined number of times, the weighting value may be increased automatically to represent the increase relative importance of that policy to the operation of the IT infrastructure.

The policy usage information visual rendering system 450 makes use of configuration information for the IT infrastructure 410, stored in a system resource of the IT infrastructure 410, to identify each computing device and/or computer related system resource that is to be depicted in a graphical representation of the IT infrastructure 410. The policy usage information visual rendering system 450 obtains performance data from the performance data storage 430 corresponding to the identified computing systems and/or computer related system resources. The policy usage information visual rendering system 450 further obtains policy information from the policy database 440. This policy information may include policy weighting value information for each policy in the policy database 440.

Since the performance data from the performance data storage 430 includes identifiers of the policies affecting the behavior of the IT infrastructure computing devices and/or computer related system resources, the performance data may be correlated with the policy information to identify the weighting values for each policy referenced in the performance data. Furthermore, the performance data may include information about the evaluation of the policies for each computing device and/or computer related system resource. This evaluation information may include, for example, the number of times the policy was evaluated for this computing device/resource, timestamp information regarding when each policy was evaluated, whether and/or the number of times the policy was evaluated positively or negatively, the number of times policies were evaluated for each decision point on a resource, where a decision point is a specific point on a resource where policy guidance is needed, and the like. The use of each of these types of evaluation information in the generation of a graphical representation of the computing device and/or computer related system resource will be described in greater detail hereafter.

The evaluation information is used by the policy usage information visual rendering system 450 along with the policy weighting value information to determine the size and emphasis characteristics for each graphical element representing each computing device and/or computer related system resource of interest in the IT infrastructure 410. There are a number of different ways in which the size and emphasis characteristics may be determined based on this information. The following are only exemplary of the various ways in which size and emphasis characteristics may be determined for the graphical elements representing the computing devices and/or computer related system resources and are not intended to state or imply any limitation as to the manner by which the evaluation information and policy weighting value information may be combined or used to determine a graphical representation of computing devices and/or computer related system resources of an IT infrastructure (hereafter collectively referred to as system resources). Many modifications to the algorithms and methodologies described herein may be made without departing from the spirit and scope of the present invention.

Graphical Element Size Characteristic

In a first exemplary embodiment of the present invention, the size characteristic of the graphical element is determined based on a function of the number of policies that are applicable to that system resource, i.e. either evaluated by the system resource or those policies whose results directly affect the system resource, and a sum of the weighting values of these policies. In one exemplary embodiment, this function is determined to be the product of the number of policies and the sum of the weighting values. Thus, in this exemplary embodiment, each graphical element represents a system resource with the size of the graphical element being calculated as the number of policies applicable to that system resource multiplied by the sum of all the weighting values of these policies. This function may be represented as follows:

$$S = N \times \sum_{p=1}^{N} W_p \qquad (1)$$

where S is the size of the graphical element, N is the number of policies applicable to that system resource, p is an identifier of a particular policy, and $W_p$ is a weighting value associated with policy p. By setting the size to a function of the number of policies applicable to the system resource and the sum of all of the weighting values of these applicable policies the graphical element provides a visual indication as to what system resources are more influenced by policies than other system resources. Larger sized system resource graphical elements have either more applicable policies or more important applicable policies, as determined from the weighting values. Insignificant system resources that are not very policy-based are minimized by this size function.

In another exemplary embodiment of the present invention, the size characteristic of the graphical element is determined based on a function of the number of decision points in each system resource. A decision point is a specific point on a system resource where policy guidance is needed and policies are evaluated to determine how the system resource is to operate. Thus, for example, an application in an IT infrastructure may have a large number of decision points at which policies in the policy database 440 are consulted to determine how the application is to operate. An example of such an application may be a business negotiation application in which the negotiation application communicates with other business systems to negotiate the sale of a particular item or service. Such a business negotiation application may make use of business policies in the policy database 440 to determine how to modify offers, when to accept offers, as well as other operational decisions.

Each system resource may have a number of points in its operation where policies are consulted. The number of places in the operation of the system resource where call-outs to a policy engine or for policy guidance are made may be used as a number of decision points associated with that system resource. The size characteristic of the graphical element representing that system resource may be determined as a function of the number of decision points. That is, the size characteristic may be determined based on:

$$S = F(dp) \quad (2)$$

where S is the size characteristic, dp is the number of decision points, and F(dp) is a function of the number of decision points. Using this mechanism for determining the size characteristic of a graphical element representing a system resource permits a visual representation in which resources having more call-outs for policy guidance are more prominent in the visual representation. Such system resources are more policy-oriented and thus, changes in policies may have a greater affect on these system resources.

In yet another embodiment of the present invention, the size characteristic of the graphical element may be determined based on a function of the number of policies associated with the system resource, a normalized sum of the weighting values of these associated policies normalized using the largest weighting sum of one system resource. In such an embodiment, each graphical element represents a corresponding system resource with the size of the graphical element being determined based on the number of policies applicable to that system resource and the relative sum of weighting values of all associated policies. The result is the normalized rather than being an absolute result. In one exemplary embodiment, the result is normalized by the largest sum weighting value for that resource. An example function that may be used in this embodiment is as follows:

$$S = \left( N \times \sum_{p=1}^{N} W_p \right) / LW \quad (3)$$

where LW is the largest value for $W_p$ from $W_1$ to $W_N$. The result of determining the size characteristic for graphical elements representing system resources in this manner is a visual representation of the IT infrastructure in which resources that are more influenced by policies than others are made more prominent in the visual representation. Larger resource have either more policies or more important policies (based on the weighting value). Normalization, in this embodiment, permits resources having different ranges of importance to be placed on even footing in order to obtain a better comparison of the resources.

In a further embodiment of the present invention, the size characteristic of the graphical elements representing system resources may be determined based on a function of the number of policy evaluations within a predetermined period of time and the weighting values for these policies. That is, this embodiment is based on the weighting values and a rate at which policy evaluations are made with regard to this system resource. Thus, in one exemplary embodiment, the graphical element represents a system resource with the graphical element's size being determined based the number of policy evaluations per unit time multiplied by the weighting value for each policy. This function may be represented as follows:

$$S = \sum_{p=1}^{N} (E_p / t) \times W_p \quad (4)$$

where S is the size characteristic, N is the number of policies applicable to the system resource, p is an identifier of a policy, $E_p$ is the number of evaluations in time t, and $W_p$ is the weight value for policy p. As a result of determining the size characteristics of graphical elements using this formulation, policies that are being evaluated more often, i.e. are giving more guidance to the operation of the IT infrastructure, are emphasized in the visual representation. Larger graphical elements represent policies that are being evaluated frequently or are more important policies (based on the weighting values). Insignificant policies that are being evaluated infrequently or who have insignificant weighting values are minimized in the visual representation of the IT infrastructure.

Graphical Element Emphasis Characteristic

In addition to having a plurality of methodologies for determining the size characteristic of the graphical elements, the present invention provides multiple mechanisms for determining what emphasis characteristics to apply to the graphical elements. Any one or more of these mechanisms for determining emphasis characteristics may be used in combination with any one or more of the mechanisms for determining the size characteristics of graphical elements described above.

In the following exemplary embodiments, for ease of explanation, it will be assumed that the emphasis characteristic that is being selected by the use of the mechanisms of the present invention is a color of the graphical element. However, as previously described above, there may be many different types of emphasis characteristics that can be applied to the graphical elements of the present invention.

In fact, in some embodiments of the present invention different combinations of emphasis characteristics may be applied to graphical elements by utilization of more than one of the following exemplary mechanisms for determining an emphasis characteristic. Thus, for example, a first mechanism may be used to determine a color of the graphical element and a second mechanism may be used to determine if flashing is to be applied to the graphical element, a rate of flashing of the graphical element, and so forth.

In each of the following embodiments, emphasis characteristics are determined with regard to a spectrum of values for performance data. That is, a range of values for the particular performance data being utilized is established with the various emphasis characteristics being associated with portions of the range of values for the performance data. In this way, the emphasis characteristics are associated with relative levels of importance of the system resources with regard to the particular performance data being utilized.

In a first exemplary embodiment of the present invention the emphasis characteristic, e.g., color, of the graphical element is determined based on the number of times policies are evaluated in association with the system resource represented by the graphical element. With such an embodiment, a color spectrum is provided in which system resources having a lowest number of policy evaluations associated with them having a more "negative" color or less predominant color and system resources having a highest number of policy evaluations associated with them having a more "positive" color or more predominant color. For example, a negative color may be associated with ranges of policy evaluations corresponding to a lowest ⅓ of the total range of expected number of policy evaluations, a neutral may be associated with a middle ⅓ of the total range of expected number of policy evaluations, and a positive color may be associated with the top ⅓ of the total range of expected number of policy evaluations. In this embodiment, a "positive" color refers to a color that is more prominent to the human eye in a visual representation while a "negative" color is a color that is less prominent to the human eye in a visual representation. Thus, in one example, a "positive" color may be bright red while a "negative", color may be black or grey.

As an example, in a range of 0 to 1000 evaluations, the grey emphasis color may be associated with a number of policy evaluations corresponding to the range of 0 to 333 policy evaluations. A brown emphasis color may be associated with the middle ⅓ of the range, i.e. number of evaluations being between 334 and 666 policy evaluations. The red emphasis color may be associated with the top ⅓ of the range, i.e. number of evaluations being between 667 and 1000 policy evaluations.

In this way, the colors associated with the graphical elements is a visual cue as to the activity of policy evaluation for each system resource. Positive colors show system resources that have large amounts of activity with regard to policy evaluations while negative colors show system resources that have relatively small amounts of policy evaluation activity. The use of such emphasis colors aids in drawing the attention of a human user to those resources that should be at the same level of policy-based management as other resources.

In another embodiment of the present invention, the emphasis characteristic, e.g., color, is determined based on a hit-ratio of the policies associated with the system resource. This hit ratio may be determined by dividing the number of times a policy is evaluated positively by a total number of times a policy is evaluated for that system resource. This may be done on a per policy basis for each system resource.

An average or other function of these hit ratios may be obtained to determine a final value for determining an emphasis characteristic for the graphical element.

Alternatively, each hit ratio for each policy may be individually used to identify the hit-miss activity of that system resource with regard to that particular policy. An example formulation for determining the emphasis characteristic based on hit ratios may be as follows:

$$EC = \left(\sum_{p=1}^{N} (TP_p / E_p)\right) / N \quad (5)$$

where EC is the emphasis characteristic value, p is an identifier of a policy, $TP_p$ is a total number of positive evaluations for policy p, $E_p$ is a total number of evaluations of policy p, and N is a total number of policies associated with the system resource.

Thus, a visual representation of each system resource's activity with regard to where policies are having a greatest positive effect may be obtained. With this mechanism, a range of hit-ratios may be established from one end where no policies are evaluated positively to another end where all policy evaluations have positive results. A color spectrum may be associated with this range in which negative colors are associated with the first end (no policies evaluated positively) and positive colors are associated with the second end (all policies evaluated positively). Based on the hit-ratio of a system resource, a corresponding color is associated with the system resource's graphical element.

In this way, system resources in which policies have the greatest positive effect are depicted more prominently in the visual representation of the IT infrastructure. In addition, the visual representation shows where policies are ineffective, i.e. the negative colored graphical elements, and may call attention to these system resources so that an investigation as to why the policies are not providing guidance to these system resources may be performed.

In a similar embodiment, the determination of the emphasis characteristic may be performed based on the number of times policies were evaluated positively for a system resource, divided by the total number of policies that were evaluated in association with that system resource. This is a hit-ratio that is based on the system resource rather than the policy as in the previously described mechanism. In this embodiment, the range of performance data may be a range having a first end point of no policies being applicable on that system resource, i.e. evaluated positively, to a second end point where every policy evaluation on that system resource is not applicable to the system resource. A color spectrum may be placed between these two end points with the color of a particular system resource graphical element being determined in accordance with the following function:

$$EC = \left(\sum_{p=1}^{N} TP_p\right) / \left(\sum_{p=1}^{N} E_p\right) \quad (6)$$

where EC is the emphasis characteristic value, p is an identifier of a policy, $TP_p$ is a total number of positive evaluations for policy p, $E_p$ is a total number of policy evaluations for policy p, and N is a total number of policies associated with the system resource.

With the use of this mechanism to determine the emphasis characteristic of the graphical elements representing system resources, the resulting visual representation shows where policies are having the greatest positive effect for each resource. Again, this representation may show where policies on a resource are ineffective and may call attention to these system resources to investigate why the policies are not providing the proper guidance.

In another embodiment of the present invention, the emphasis characteristic, e.g., color, may be determined based on the number of times policies are evaluated for all decision points on a resource, divided by the number of decision points. This provides an average number of policy evaluations per decision point for a system resource. When performed over a particular time interval, this formulation may provide an average rate of policy evaluations per decision point. This relationship may be defined by the following function:

$$EC = \left(\sum_{p=1}^{N} E_p\right) / DP \quad (6)$$

where EC is the emphasis characteristic value, p is an identifier of a policy, Ep is the total number of evaluations for policy p, and DP is the total number of decision points.

With this embodiment of the present invention, a range of average number of policy evaluations per decision point, or average policy evaluation rates per decision point, is generated with a corresponding color spectrum being applied between the end points. Thus, an average policy evaluation rate or average number of policy evaluations per decision point may be correlated to a particular color that is to be used as an emphasis characteristic for a graphical element representing the system resource.

In yet another embodiment of the present invention, the emphasis characteristic is determined based on the number of times policies were evaluated positively for the system resource and the total number of positive evaluations of policies across all system resources. In this embodiment, the range would be from a first end point where no policies are positively evaluated for the system resource to a second end point where all of the policies evaluated for that system resource were evaluated positively with a corresponding color spectrum being applied to the range. The resulting visual representation provides a depiction of which system resources have the least to the greatest positive influence by policies on a relative scale. Positive colors show the best relative influence while negative colors show the least influence.

Figure 5:
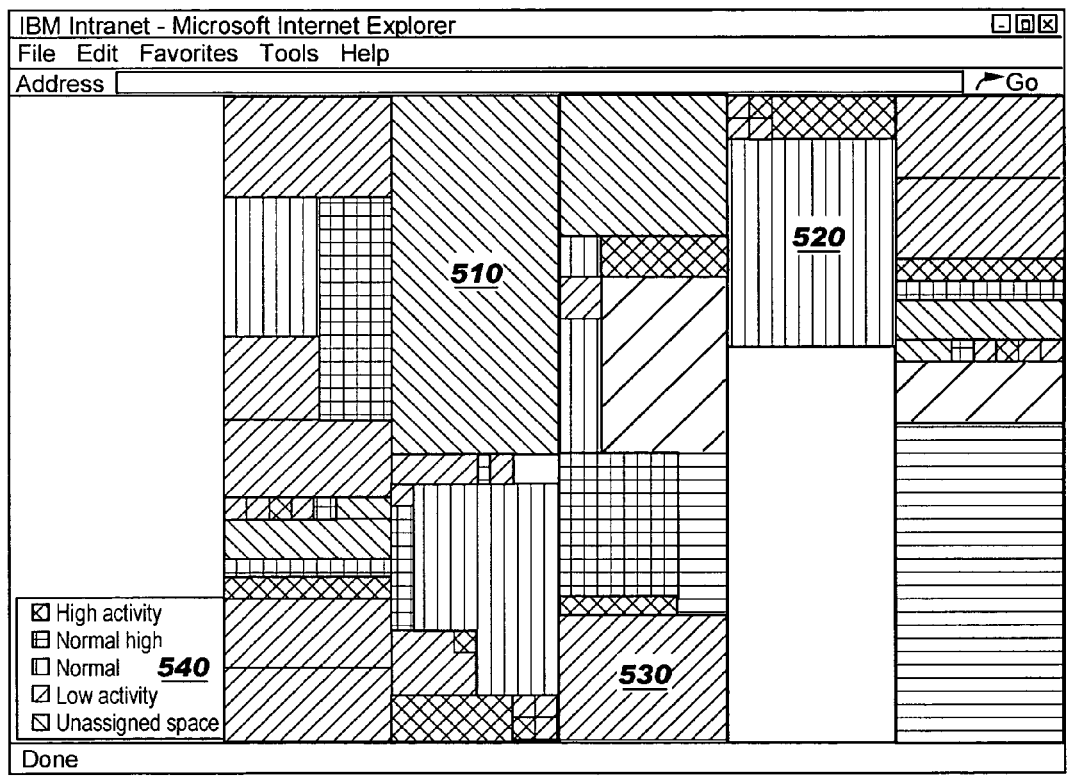
FIG. 5 is an exemplary diagram illustrating one possible visual representation in accordance with one exemplary embodiment of the present invention.

FIG. 5 is an exemplary diagram illustrating one possible visual representation in accordance with one exemplary embodiment of the present invention. As shown in FIG. 5, the visual representation is comprised of a plurality of graphical elements 510, 520, 530, etc., that represent system resources of an IT infrastructure. Each graphical element 510, 520 and 530 has a size and an emphasis characteristic. In this particular example, the emphasis characteristic is color (which is depicted as different shadings in FIG. 5). Moreover, the graphical elements in this depicted embodiment are rectangular areas. A legend 540 is provided to identify what each emphasis characteristic represents.

With this representation, a user may quickly identify which system resources have the most/least policies guiding their behavior and the frequency of evaluation of these policies. Thus, a relative importance representation from the stand point of policy behavior is generated by the present invention. A user may select graphical elements 510-530 within the visual representation in order to obtain more information about the system resource. For example, a pop-up window may be generated upon selection of a graphical element that provides an identifier of the system resource as well as raw performance data used to generate the graphical element 510-530 in accordance with the present invention.

Figure 6:
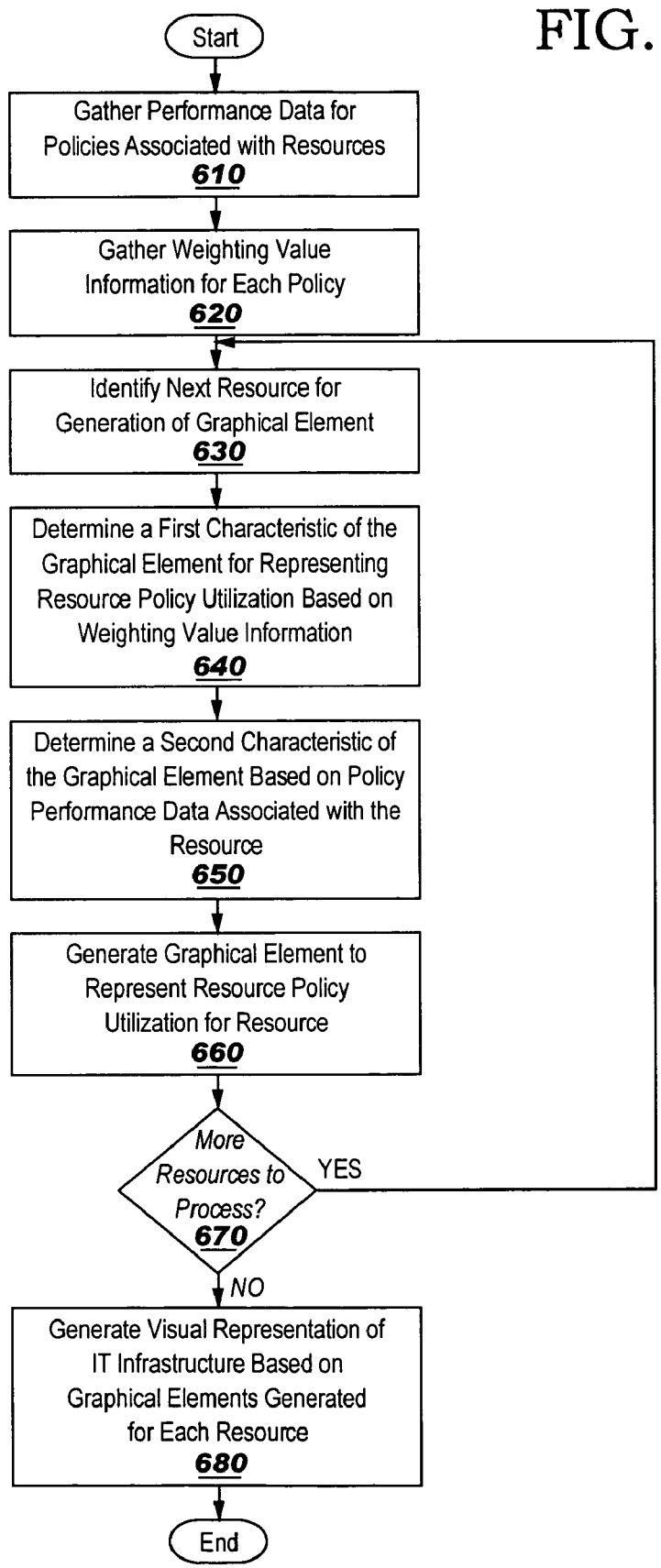
FIG. 6 is a flowchart outlining an exemplary operation of one exemplary embodiment of the present invention with regard to visually representing the relative affect of policies on resources in an information technology infrastructure.

FIG. 6 is a flowchart outlining an exemplary operation of one exemplary embodiment of the present invention with regard to visually representing the relative affect of policies on resources in an information technology infrastructure. It will be understood that each block of the flowchart illustration, and combinations of blocks in the flowchart illustration, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustration support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based computer systems which perform the specified functions or steps, or by combinations of special purpose hardware and computer instructions.

As shown in FIG. 6, the operation starts by gathering performance data for policies associated with system resources (step 610). The weighting value information for each policy is then obtained (step 620) and a next resource for generation of a graphical element is identified (step 630). A first characteristic of the graphical element for representing resource policy utilization is then determined based on the weighting value information (step 640). For example, this first characteristic may be a size of the graphical element, as discussed above.

A second characteristic, such as an emphasis characteristic, is then determined based on policy performance data associated with the system resource (step 650). Thereafter, the graphical element for representing the system resource is generated (step 660).

A determination is then made as to whether there are additional system resources to be processed (step 670). If so, the operation returns to step 630 and the process is repeated for each system resource that is to be represented in the visual representation of the IT infrastructure. If no more system resources are to be processed, the visual representation of the IT infrastructure is generated based on the graphical elements generated for each system resource (step 680) and the operation terminates.

Thus, the present invention provides a mechanism for generating a visual representation of an IT infrastructure in which the relative importance of system resources with regard to the application of policies to these system resources is generated. From the visual representation, a user may quickly determine which system resources whose behavior is most/least guided by policy evaluations and which system resources are affected by policy evaluations more frequently. In this way, a user's attention may be brought to those system resources where management of policies of the IT infrastructure is likely to affect the behavior of the system resources.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, and DVD-ROMs. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for visually rendering a representation of a system resource, comprising:
    collecting performance data for one or more policies associated with resources, wherein the performance data is collected from a performance data storage device associated with a policy evaluation engine, wherein the performance data includes one or more of a number of times each of the one or more policies was evaluated for the system resource, timestamp information regarding when each of the one or more policies was evaluated, a number of times each of the one or more policies was evaluated positively, a number of times each of the one or more policies was evaluated negatively, and a number of times each of the one or more policies was evaluated for each decision point of the system resource;
    collecting weighting value information for the each of the one or more policies;
    identifying a next resource for generation of a graphical element, wherein the graphical element is one of a geometric shape, a bar in a bar-chart, a line in a line-graph, a portion of a pie-chart, and an element in a block diagram;
    determining a size characteristic of the graphical element representing the system resource based on one or more relative weighting values corresponding to one or more policies associated with the system resource;
    determining an emphasis characteristic of the graphical element based on performance data corresponding to the one or more policies associated with the system resource; and
    generating a visual representation of the system resource using the graphical element having the size characteristic and the emphasis characteristic, wherein the emphasis characteristic is at least one of a color of the graphical element and a visual effect to be applied to the graphical element.

2. A computer program product, comprising:
    a computer recordable-type medium storing computer readable program code for visually rendering a representation of a system resource, the computer program product comprising:
    instructions for collecting performance data for one or more policies associated with resources, wherein the performance data is collected from a performance data storage device associated with a policy evaluation engine, wherein the performance data includes one or more of a number of times each of the one or more policies was evaluated for the system resource, timestamp information regarding when each of the one or more policies was evaluated, a number of times each of the one or more policies was evaluated positively, a number of times each of the one or more policies was evaluated negatively, and a number of times each of the one or more policies was evaluated for each decision point of the system resource;
    instruction for collecting weighting value information for the each of the one or more policies;
    instructions for identifying a next resource for generation of a graphical element, wherein the graphical element is one of a geometric shape, a bar in a bar-chart, a line in a line-graph, a portion of a pie-chart, and an element in a block diagram;
    instructions for determining a size characteristic of a graphical element representing the system resource based on one or more relative weighting values corresponding to one or more policies associated with the system resource;
    instructions for determining an emphasis characteristic of the graphical element based on performance data corresponding to the one or more policies associated with the system resource; and
    instructions for generating a visual representation of the system resource using the graphical element having the size characteristic and the emphasis characteristic, wherein the emphasis characteristic is at least one of a color of the graphical element and a visual effect to be applied to the graphical element.

3. A system for visually rendering a representation of a system resource, comprising:
    means for collecting performance data for one or more policies associated with resources, wherein the performance data is collected from a performance data storage device associated with a policy evaluation engine, wherein the performance data includes one or more of a number of times each of the one or more policies was evaluated for the system resource, timestamp information regarding when each of the one or more policies was evaluated, a number of times each of the one or more policies was evaluated positively, a number of times each of the one or more policies was evaluated negatively, and a number of times each of the one or more policies was evaluated for each decision point of the system resource;
    means for collecting weighting value information for the each of the one or more policies;
    means for identifying a next resource for generation of a graphical element, wherein the graphical element is one of a geometric shape, a bar in a bar-chart, a line in a line-graph, a portion of a pie-chart, and an element in a block diagram;

means for determining a size characteristic of a graphical element representing the system resource based on one or more relative weighting values corresponding to one or more policies associated with the system resource;

means for determining an emphasis characteristic of the graphical element based on performance data corresponding to the one or more policies associated with the system resource; and means for generating a visual representation of the system resource using the graphical element having the size characteristic and the emphasis characteristic, wherein the emphasis characteristic is at least one of a color of the graphical element and a visual effect to be applied to the graphical element.

* * * * *